Patented Aug. 16, 1949

2,479,283

UNITED STATES PATENT OFFICE 2,479,283

CYCLIC ORGANIC COMPOUNDS

Richard R. Whetstone, Berkeley, Calif., assignor to Shell Development Company, San Francisco, Calif., a corporation of Delaware No Drawing. Application December 2, 1946, Serial No. 713,455

15 Claims. (Cl. 260—333)

This invention relates to certain novel substituted compounds in the dihydropyran series of compounds, and to a method for their preparation. More particularly, the present invention relates to certain dihydropyran compounds having both a carbonyl group and either a halogen atom or a hydrocarbyl group directly attached to a carbon atom of the dihydropyran ring, and to a method for their preparation from alpha, beta-olefinically unsaturated aldehydes having either a halogen atom or a hydrocarbyl group attached to the alpha carbon atom. The preparation of certain derivatives thereof, such as the correspondingly substituted tetrahydropyran derivatives referred to hereinafter also is provided as within the broader aspects of the present invention.

The dihydropyran carbonylic compounds of the present invention may be characterized generically as having apparent structures corresponding to the structural formula

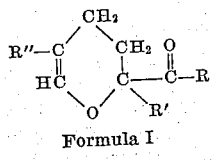

Formula I wherein R represents a member of the class consisting of hydrogen, hydroxy, metaloxy and hydrocarbyloxy, R' represents a member of the class consisting of halogen and hydrocarbyl, and R'' represents a member of the class consisting of hydrogen, halogen and hydrocarbyl. The corresponding tetrahydropyran derivatives that advantageously may be prepared from the foregoing substituted dihydropyran compounds may be characterized generically as having apparent structures corresponding to the structural formula

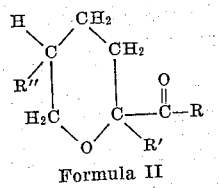

Formula II wherein R, R', and R'' each have their foregoing significance. Reference will be made hereinafter to a number of specific compounds falling within the generic class of compounds provided by the present invention. However, at the present time certain of the preferred members of the class may be mentioned individually; namely, the dihydropyran derivatives 2,5-dimethyl-3,4-dihydro-1,2-pyran-2-carboxaldehyde, 2,5-dichloro-3,4-dihydro-1,2-pyran-2-carboxaldehyde, and 2 - methyl-3,4-dihydro - 1,2-pyran-2-carboxaldehyde.

Here and elsewhere throughout the present specification, and in the appended claims, particular reference is made to the compounds wherein the groups designated in the foregoing formula by

or certain groups derived therefrom, and by R', are attached to the ring in the 2 position thereof. The formation in the present process of the isomeric compounds wherein the groups

or a group derived therefrom, and R', are attached to the carbon atom in the 3 position of the ring, is not excluded, and in some cases may occur to an appreciable extent. It will be appreciated that by use herein of the term "apparent" in connection with the designation of the structure of any one compound, or class of compounds, it is intended to refer also to such possible isomeric compounds insofar as they are obtainable via reaction of the herein defined class of unsaturated aliphatic aldehydes in the process of the present invention.

It has been discovered unexpectedly that compounds of the present class may be prepared in a highly efficient and effective manner by means of a process which comprises condensing at a suitably elevated temperature and in the presence of a suitable polymerization inhibitor an alpha,beta-unsaturated aliphatic aldehyde having attached to the alpha carbon atom either a halogen atom, or a hydrocarbyl group that is attached to the alpha carbon atom through a single bond. It was in many respects a surprising discovery to find that unsaturated aldehydes of the stated class could be caused to react to form heterocyclic compounds as provided by the present invention. It is known, for example, that many of the reactions of alpha,beta-unsaturated aldehydes are markedly favored by and in some cases completely dependent upon, the presence of a substitutable hydrogen atom in the alpha position relative to the carbonyl group. It would not normally be expected that alpha,beta-unsaturated aliphatic aldehydes having no hydrogen atom directly attached to the alpha carbon atom would readily undergo condensation reactions particularly of the type of reaction provided by the present invention. To the contrary of such normal expectations, however, it has been found that the present alpha,beta-unsaturated aldehydes not only undergo condensation reaction in the presence of polymerization inhibitor such as hydroquinone, and at an elevated temperature, but that such reaction may be effected with considerably greater yield, and efficiency and economy of operation, than have been attained in the case of certain related alpha,beta-unsaturated aldehydes heretofore employed. It also has been discovered that the compounds produced by such condensation reaction of the present class of alpha,beta-unsaturated aldehydes possess unique and unexpected properties that distinguish them in several respects from compounds heretofore known, and that render them of corresponding advantage in the arts.

The unsaturated aldehydes which may be employed in accordance with the process of the present invention are those unsaturated aliphatic aldehydes that have an olefinic bond in the alpha,beta position relative to the carbonyl group and that have attached to the alpha carbon atom either a halogen atom or a singly bonded hydrocarbyl group. The advantages of the invention are most effectively realized by application in the present process of those unsaturated aliphatic aldehydes having structures corresponding to the structural formula

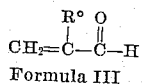

Formula III wherein R° signifies either a halogen atom or a hydrocarbyl group. As the halogen, there may be present either a chlorine atom, a bromine atom, a fluorine atom, or an iodine atom, although preferably there are employed the unsaturated aldehydes which contain only either chlorine or bromine as the halogen, i. e., alpha-chloroacrolein and alpho-bromoacrolein. The hydrocarbyl group may be either an open-chain hydrocarbyl group or a cyclic group such as a cyclic non-aromatic hydrocarbyl group or an aromatic hydrocarbyl group. It is preferred to employ those aldehydes wherein the hydrocarbyl group is an alkyl group, preferably one containing from 1 to 10 carbon atoms, inclusive.

Representative unsaturated aldehydes which thus may be employed, in addition to the alpha-haloaldehydes referred to, include the alpha-alkylacroleins such as alpha-methylacrolein, alpha-ethylacrolein, alpha-propylacroleins, alpha-isopropylacrolein, the alpha-butylacroleins, the alpha-pentylacroleins, the alpha-hexylacroleins, the alpha-heptylacroleins, and homologous unsaturated aldehydes having an alkyl group attached to the carbon atom in the alpha position. There also may be employed unsaturated aldehydes corresponding to the foregoing formula wherein R° of the formula signifies an open chain or cyclic group containing one or more olefinic bonds. More desirably, however, the group represented by R° is one not readily hydrogenated, i. e., either a saturated hydrocarbyl group or an aromatic group. If the group represented by R° is cyclic in nature, it may be either cycloaliphatic or aromatic in nature or, less desirably, cycloolefinic in character. Representative unsaturated aldehydes corresponding to the foregoing formula and containing a cyclo-aliphatic group thus are alpha-cyclopentylacrolein, alpha-cyclohexylacrolein, alpha-(2-ethylcyclohexyl)acrolein, alpha-(3-cyclohexylpropyl)acrolein, and homologous and analogous aldehydes. As unsaturated aldehydes containing an aromatic group, there may be employed, for example, alpha-phenylacrolein, alpha-tolylacrolein, alpha-benzylacrolein, alpha-(2-phenylethyl)acrolein and homologous and analogous aldehydes corresponding to the foregoing formula.

It will be appreciated that the hydrocarbyl group that may be represented by the R° in the foregoing formula may be either substituted or unsubstituted, provided such additional substituent groups, if any, are non-reactive under the conditions employed in the present process and are not in a position in the molecule to affect unfavorably the reactivity of the molecule as a whole in its application in the present process. Substituent groups which thus may be present include, for example, halogen, carbonitrile, one or more ethereal oxygen atoms, etc.

When one of the foregoing class of unsaturated aldehydes is employed in the process of the invention, the product directly obtained is a dihydropyran compound corresponding in apparent structure to the previously given structural formula wherein R' and R'' represent the same substituent group, i. e., both R' and R'' represent either the same halogen group or the same hydrocarbyl group, and wherein R represents hydrogen. A valuable modification of the process of the present invention comprises the utilization in the process of the invention, of a mixture of two alpha,beta-unsaturated aldehyde at least one of which is a member of the hereindefined class of unsaturated aldehydes. When both of the unsaturated aldehydes have structures corresponding to the above formula, but which differ from each other, there are obtained in excellent yield compounds corresponding in structure to Formula I but in which R' and R'' represent different substituent groups, other than hydrogen, within the defined classes, R again representing hydrogen. When, for example, acrolein is employed as the second reactant aldehyde only one of the two aldehydes thus being of the present class, there are obtained in excellent yield compounds corresponding in structure to Formula I and wherein R' and R'' again represent different groups or atoms, but wherein one of R' and R'' represents hydrogen. The use in this manner of two different alpha,beta-unsaturated aldehydes provides a highly efficient method of preparing a large number of specific derivatives of di- and tetra-hydropyran that could have been prepared heretofore only by complex and less efficient processes that would not be practicable for application say on a commercial scale.

On the basis of the laws of probability, it would be expected that the use of two different alpha,beta-unsaturated aldehydes would lead, in the simplest case, to the formation of four different products in proportions dependent upon the relative amounts of the two aldehydes employed. For example, the use of equimolecular amounts of two different unsaturated aldehydes such as two different aldehydes of the present class or one of the present class with another alpha,beta-unsaturated aldehyde such as acrolein, would be expected, from consideration of the laws of probability, to result in the formation of no more than 50 per cent of the products of cross reaction between the two aldehydes. It has been found, however, that the use of two aldehydes, at least one thereof being a member of the present class, favors in an unexpected manner the formation of products of cross reaction as the principal products of reaction, with only minor amounts of other possible products of reaction being formed. Contrary to normal expectations, yields of products of cross reactions (i. e., compounds corresponding to Formula I in structure when R' and R'' are different) as high as, for example, 63% of the total reaction products formed, have been obtained. When the two aldehydes are employed in proportions other than equimolecular, the absolute yields may be somewhat lower than those just mentioned, depending upon the particular proportions used, but in any event the yields of products of cross reaction substantially exceed those that would be predicted on the basis of the laws of probability.

Different alpha,beta-unsaturated aldehydes which thus may be employed together include, for example, alpha-methacrolein and alpha-chloroacrolein, alpha-methylacrolein and acrolein, alpha-ethylacrolein and acrolein, alpha-phenylacrolein and alpha-cyclohexylacrolein, alpha-acrolein and alpha-phenylacrolein, and chloroacrolein and alpha-phenylacrolein, and similar combinations wherein at least one of the aldehydes is a member of the present class. Highly advantageous results are obtained when acrolein is employed as the second unsaturated aldehyde. It is preferred that both of the unsaturated aldehydes are members of the herein defined class of unsaturated aldehydes. When two alpha,beta-unsaturated aldehydes thus are employed, most advantageous results are obtained when the alpha-substituted aldehyde of the present class constitutes at least 25 per cent, on a molar basis, of the total aldehyde reactant employed.

The process of the present invention comprises effecting the condensation of one or more aldehydes as described above, at an elevated temperature and in the presence of a suitable polymerization inhibitor, thereby forming compounds in the dihydropyran series corresponding to Formula I in structure, R representing hydrogen, followed by, if desired, modification of the functional group

and/or saturation of the dihydropyran ring with hydrogen to obtain derivatives thereof represented by Formula I or II. As the polymerization inhibitor there may be employed any suitable compound or material of the class known to the art as antioxidants or polymerization inhibitors, and that is inert with respect to reaction with the unsaturated aldehyde or aldehydes, and the products of the present reaction, under the existing conditions. Among the compounds which may be employed effectively are, for example, various quinones, amines, phenolic compounds, nitro-aryl compounds, mercaptans, and the like. Hydroquinone is highly effective and generally may be employed with fully satisfactory results. In place of hydroquinone, other compounds may be employed, such as benzoquinone, naphthoquinone, phenol, the cresols, a naphthol, a xylenol, thymol, catechol, eugenol, resorcinol, pyrogallol, orcinol, guaiacol, nitrobenzene, dinitrobenzene, a nitrophenol, a nitrosophenol or the like. Inorganic inhibitors which may be employed include, for instance, halogens, copper and alloys thereof, sulfur, selenium, and tellurium. Inorganic elements such as the foregoing also may be present in combined form in organic molecules, as in polysulfides, thioacids, selenoacids, etc.

The amount of polymerization inhibitor that is employed is a minor amount sufficient to inhibit or to prevent the formation of higher polymeric products of reaction under the conditions of reaction. The exact amount that is most suitable depends upon the particular polymerization inhibitor employed, the conditions under which the reaction is effected, the particular reactants involved, and similar factors. Frequently, only a trace of polymerization inhibitor is necessary. Generally speaking, amounts of polymerization inhibitor of from about 0.01 to about 5 per cent by weight of the unsaturated aldehyde or aldehydes are effective, although the optimum amount may vary within this range depending upon the particular circumstances. Amounts of hydroquinone, for example, of from about 0.025 to about 2 per cent are particularly effective.

The reaction may be effected in the presence of a suitable inert organic solvent if desired, although particularly advantageous results have been obtained in the absence of any added solvent, as herein described. As the solvent, there may be employed an aromatic hydrocarbon such as benzene, toluene, xylene, ethylbenzene, or mixtures of aromatic hydrocarbons; an aliphatic hydrocarbon such as octane, a nonane, or other aliphatic hydrocarbons that are liquid under the conditions employed; an ether, such as diethyl ether, dipropylether, diisoamylether; a heterocyclic compound such as dioxane, furan, etc.; and the like. Mixtures of solvents may be used if desired. Benzene is particularly satisfactory as the solvent, if one is employed, and generally is preferred. There may be employed up to about 10 parts of solvent per part of aldehyde, preferably up to about 2 parts of solvent per part of aldehyde.

The process of the invention is executed by heating the aldehyde of the present class, or mixture of aldehydes comprising an aldehyde of the present class, at an elevated temperature under sufficient pressure to maintain the reaction mixture in the liquid state. Temperatures of from about 50° C. to about 240° C., may be used, in general, although at times either somewhat higher or somewhat lower temperatures may be employed satisfactorily. The preferred range of temperature depends in part upon the particular unsaturated aldehyde used. Lower temperatures within the stated range, desirably from about 50° C. to about 100° C. are most effective in the case of the alpha-haloacroleins. Higher temperatures, such as from about 100° C. to about 240° C. preferably from about 140° C. to about 200° C., generally are most effective with the alpha-hydrocarbylacroleins of the present class. Temperatures sufficiently high to promote excessive decomposition of reactants or reaction products should be avoided. The reaction preferably is effected under superatmospheric pressure, although with higher boiling reactants and reaction products, atmospheric or lower pressures may be employed. In any case however, the pressure is maintained at or above the total vapor pressure of the reaction mixture at the temperature of reaction. Pressures sufficient to maintain the liquid state and from atmospheric pressure up to about 3000 pounds per square inch thus may be employed. Preferably, the pressure is maintained between about 500 pounds per square inch and about 2000 pounds per square inch. If superatmospheric, the pressure conveniently may be autogenous as in a closed reaction vessel, or it may be applied by introduction of a suitable inert gas such as nitrogen, carbon dioxide, methane, ethane, propane, etc., into the reaction vessel. Oxygen desirably is excluded from the reaction vessel.

The reaction time may be varied over relatively wide limits. Higher temperatures of reaction generally enable the use of shorter reaction times. Reaction times of from about ¼ hour or less to 24 hours or more have been employed. Under the optimum conditions of reaction, satisfactory completion of the reaction ordinarily is obtained with a reaction time of from about ¼ hour to about 3 hours.

The process of the invention may be executed either batchwise, intermittently, or continuously. For batchwise operation, the polymerization inhibitor and the organic solvent, if one is employed, may be mixed with the unsaturated aldehyde reactant or reactants, and the resultant mixture heated to a suitable temperature and under pressure adequate to maintain the liquid phase, for a time sufficient to complete the reaction. The reaction preferably is carried out in a reaction vessel which may be either glass-lined or constructed of stainless steel, iron, carbon-steel, or alloys of metals such as copper, nickel, chromium, etc. A glass-lined reaction vessel generally is preferable because of possible catalytic effects of metallic impurities in promoting side-reactions, extensive polymerizations, etc. In continuous operations, particular advantages are realized by effecting the reaction in the absence of any added organic solvent. A continuous stream of the unsaturated aldehyde, or mixture of unsaturated aldehydes, containing the polymerization inhibitor, thus may be passed through a reaction zone such as an elongated reaction tube maintained at a temperature within the range of suitable reaction temperatures, the dimensions of the tube and the rate of flow of the reactant stream being correlated so as to obtain adequate residence time of the reaction mixture at the reaction temperature. It will be appreciated, however, that the invention is not limited according to the particular apparatus that is employed, and a wide variety of equipment apparent to those skilled in the art may be used with advantageous results.

After completion of the reaction, the substituted dihydropyran-2-carboxaldehydes provided thereby may be recovered from the reaction mixture in any suitable away desired. Fractional distillation under reduced pressure is eminently satisfactory as a method of recovery. Other methods such as treatment with selective solvents, may be employed. If desired, any unreacted aldehyde or aldehydes may be separated from the reaction mixture and recycled through the process. The solvent, if one is employed, likewise may be reused. As recovered, at least those products formed from the lower molecular weight unsaturated aldehydes are liquid, high-boiling materials. They may be further purified, if desired, by redistillation or by any other suitable means either chemical or physical, and may be stored without appreciable decomposition, preferably under an inert atmosphere.

Products which may be prepared according to the present process from a single unsaturated aldehyde of the herein defined class comprise those compounds having apparent structures defined by Formula I when R signifies hydrogen and R' and R" both represent for example, methyl, ethyl, propyl, isopropyl, butyl, hexyl, or the like, or cyclic groups such as phenyl, xylyl, tolyl, cyclohexyl, cyclopentyl, phenethyl, cyclohexylmethyl, methylcyclohexyl, 2-cyclohexylpropyl, or homologous or analogous groups. Corresponding halo-substituted dihydropyran carboxaldehydes wherein R' and R" represent halogen, such as chlorine or bromine, also may be prepared.

When two unsaturated aldehydes are employed in the present process, there may be obtained products comprising substituted dihydropyran carboxaldehydes corresponding in apparent structure to Formula I when R' and R" differ from each other. For example, when an aldehyde of the present class is reacted with acrolein, there may be obtained as products compounds corresponding in apparent structure to Formula I when one of R' and R" represents hydrogen and the other represents, for example, methyl as in the products prepared by reaction of methacrolein with acrolein, ethyl as in the products prepared by reaction of ethacrolein with acrolein, chlorine as in the products prepared by reaction of alpha-chloroacrolein with acrolein, and the like. When, as in a preferred case, there are employed two unsaturated aldehydes both of which are of the hereindefined class, there may be obtained as products dihydropyran carboxaldehydes corresponding in apparent structure to Formula II when R' and R" both represent either hydrocarbyl or halogen, but differ from each other. Representative of these products are the compounds wherein R' and R" represent, both respectively and inversely, methyl and ethyl as in the reaction products of methacrolein and ethacrolein, methyl and isopropyl as in the reaction products of methacrolein and alpha-phenylacrolein, chlorine and bromine as in the reaction products of alpha-chloroacrolein and alpha-bromoacrolein, and in analogous products of the reaction of analogous pairs of aldehydes of the present class. Mixtures of more than two aldehydes comprising at least one aldehyde of the present class of aldehydes may be employed, if desired, although preferably a maximum of two aldehydes is employed in order to facilitate separation and/or recovery of any products that may be desired in a relatively pure form.

These and analogous compounds provided by the present invention find wide applicability as intermediates for the synthesis of derived organic compounds. Among the important derivatives provided by the present invention are the correspondingly substituted tetrahydropyran, carboxaldehydes, and the dihydropyran-carboxylic acids that are obtained by oxidation of the formyl group to a carboxyl group. Esters and salts of the carboxylic acids thus provided also may be prepared.

The oxidation of the formyl group to a carboxylic acid group generally may be accomplished in any suitable manner known to the art. The carboxaldehyde compound thus may be treated with a suitable oxidizing agent that may be either inorganic or organic. It may be oxidized catalytically by treatment with air, oxygen, oxygen-enriched air or other oxygen-containing gas, ozone, etc., in the presence of a suitable catalyst, preferably a catalyst comprising a catalytically active metal or compound of a metal. Catalytically active metals and compounds of metals include, for instance, cerium, molybdenum, vanadium, manganese, cobalt, iron, copper, chromium, selenium, osmium, nickel, etc., their oxides and/or compounds containing these or other metals. The oxidation may be effected in any suitable manner, preferably by treatment of the carboxaldehyde, which may be dissolved in an inert organic solvent such as ether, benzene, etc.

with the oxygen-containing gas in the presence of an effective amount of the catalyst. Chemical oxidizing agents which may be employed include organic oxidizing agents and inorganic oxidizing agents, such as silver oxide, hydrogen peroxide, organic peroxides, etc.

The oxidation of certain of the present dihydropyran-2-carboxaldehydes to corresponding dihydropyran-2-carboxylic acids by treatment with added oxidizing agents may at times be attended by appreciable diminution in yield due to undesired side reactions, excessive decomposition reactions, etc. However, it has been found that the oxidation of dihydropyran carboxaldehydes of the present class to the corresponding dihydropyran carboxylic acids may be effected with particular advantage by causing intermolecular oxidative-reductive reaction of the carboxaldehyde in the presence of an alkali such as a caustic alkali, resulting in the formation from two molecules of carboxaldehyde of one molecule of the corresponding dihydropyran carboxylic acid and one molecule of the corresponding dihydropyran methanol. Yields of the dihydropyran carboxylic acid in excess of 80 per cent of theory thus may be obtained. Suitable alkalies are, for example, sodium hydroxide, potassium hydroxide, lithium hydroxide, and the like. The reaction may be effected, for example, by treating the dihydropyran carboxaldehyde with the alkali which preferably has been dissolved in a liquid medium such as water to form a concentrated solution. Treatment of the dihydropyran carboxaldehyde with a 20-50 per cent solution of a caustic alkali at temperatures of from about 15° C. to about 80° C., preferably about 40° C. to about 65° C., in proportions of upwards from about 1.5, and preferably between about 1.5 and about 5 moles of alkali per mole of the dihydropyran carboxaldehyde has been found to be particularly effective. The reaction may be effected, for example, by generally adding the solution of alkali to the dihydropyran carboxaldehyde in a suitable reaction vessel that may have cooling means associated therewith. Other means of effecting contact between the two materials will be apparent and may be employed. After completion of the reaction, the carboxylic acid, which is present as a salt, may be converted to the free acid, or it may be separated from the corresponding dihydropyran methanol that is formed as by treatment with selective solvents, by crystallization, or by any other suitable means.

The substituted tetrahydropyran carboxaldehydes of the present invention may be converted to corresponding substituted tetrahydropyran methanols and tetrahydropyran carboxylic acids in a manner entirely analogous to the foregoing.

Hydrogenation of the present dihydropyran carboxyaldehydes to the corresponding tetrahydropyran carboxaldehydes, or of the present dihydropyran carboxylic acids to the corresponding tetrahydropyran carboxylic acids may be effected in any suitable manner known to the art. Treatment with molecular hydrogen in the presence of an active hydrogenation catalyst is a preferred method. As the catalyst, any suitable metal or compound of a metal falling within the class known to the art as active hydrogenation catalysts may be employed. Representative metals and compounds of metals falling within this class are, for example, Ni, Fe, Co, Cu, Ag, Mo, W, V, Pt, Pd, Au, Sn, and similar metals, compounds of metals such as catalytically active metal oxides, chromites, chlorides, etc., or combinations of metals and/or compounds of metals. In the case of the present carboxaldehydes certain of the hydrogenation catalysts and/or more drastic conditions of hydrogenation may promote reduction of the carboxaldehyde group to a hydroxymethyl group, forming the correspondingly substituted dihydropyran methanols and/or tetrahydropyran methanols. Platinum, palladium, and other noble metal hydrogenation catalysts may be employed with particular advantage for effecting hydrogenation of the present dihydropyran carboxaldehydes to the corresponding tetrahydropyran carboxaldehydes without causing reduction of the carboxaldehyde group to a hydroxymethyl group. Hydrogen pressures of from about 50 pounds per square inch to about 500 pounds per square inch are particularly suitable. Higher pressures of hydrogen, say up to 5000 pounds per inch may at times be employed. Temperatures of from about 20° C. up to about 150° C. may be employed in general. Temperatures during hydrogenation of from about 20° C. to about 70° C. are preferable, particularly when there is employed a catalyst such as platinum supported on an inert carrier such as pumice, carbon, kieselguhr, etc.

The hydrogenation may be effected in any suitable way, for example by contacting the material to be hydrogenated, either continuously, intermittently, or batchwise, with the catalyst in the presence of hydrogen gas at a suitable temperature and pressure until the desired amount of hydrogen has been absorbed, and then recovering the product of hydrogenation from the mixture. The material to be hydrogenated may, if desired, be dispersed in a suitable organic solvent such as a hydrocarbon, an ether, etc., amounts of solvent from about 0.5 part to about 5 parts by weight per part of the material to be hydrogenated being satisfactory. More or less solvent may be employed, however. After completion of the hydrogenation, the catalyst may be removed by filtration or other effective means, and the resultant mixture separated into its components by fractional distillation, by treatment with selective solvents, or in other suitable ways.

The present substituted dihydropyran-2-carboxylic acids may be converted in a similar manner to the correspondingly substituted tetrahydropyran-2-carboxylic acids by a suitable hydrogenation treatment. Either the free acids, or derivative thereof such as a salt, an ester, etc., may be subjected effectively to the hydrogenation treatment.

The compounds of the present invention are characterized by unexpected properties that contribute to their utility in various applications. They differ in important respects from apparently similar compounds that have been prepared heretofore. For example, it unexpectedly has been discovered that the compounds of the present invention having two alkyl groups attached to the dihydropyran ring, such as 2,5-dimethyl-3,4-dihydro-1,2-pyran-2-carboxaldehyde, are highly resistant to the action of water, or even of relatively strong acids. The present dialkyl-dihydropyran carboxaldehydes are in general highly stable to treatment with boiling water, and have in certain cases been found to be entirely resistant to treatment even with boiling 40 per cent sulfuric acid. The present compounds also differ from prior compounds notably in the highly effective manner in which the carboxaldehyde derivatives may be oxidized and reduced simultaneously by means of intermolecular oxidative-reductive reaction in the presence of a strong alkali, similar compounds heretofore known forming under corresponding conditions complex mixtures of materials appearing to comprise largely products of side or degradative reactions or polymerization reaction.

The carbonyl compounds of the present invention are of value for the preparation of numerous novel derived organic compounds. For example, conversion of the formyl group of the present dihydropyran carboxaldehydes and tetrahydropyran carboxaldehydes to a hydroxymethyl group provides valuable novel alcohols having apparent structures represented by the structural formula

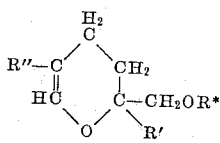

Formula IV in the case of the substituted dihydropyran compounds, and

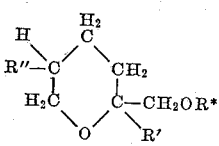

Formula V in the case of the tetrahydropyran compounds, wherein R' and R'' have their previous significance, and R* represents hydrogen. When R* represents an alkyl, aryl or a similar group, there are obtained useful ethers, such as, for example, the methyl, ethyl, propyl, isopropyl, benzyl, cyclohexyl, vinyl, allyl, crotyl, methallyl, and similar ethers. Esters of the acohols thus provided, with carboxylic or other acids such as acetic acid, propionic acid, acrylic acid, methacrylic acid, phosphoric acid, sulfuric acid, benzoic acid, etc., also may be prepared, the organic esters corresponding to the foregoing formula when R* represents acyl. The unsaturated esters and ethers, such as the allyl ethers and the acrylate esters, are of particular value in certain applications. The alcohols thus obtained also provide basis for the preparation of novel derived amines, such as primary, secondary, or tertiary amines, of halides, and of similar compounds obtainable by replacement of the hydroxyl group by an amino nitrogen group, a halogen atom, etc.

The herein described carboxaldehydes also are of particular value as raw materials for the preparation of novel acetals, and the like. Esters of the present carboxylic acids may be prepared. For example, the methyl, ethyl, propyl, isopropyl, butyl, pentyl, hexyl, and similar esters are of value as special solvents, etc. The higher fatty acid esters of the present dihydropyran methanols, such as the stearates, the oleates, the palmitates, and other esters of fatty acids containing from 10 to 18 carbon atoms, are of value as plasticizers, lubricants in molding compositions and the like. Unsaturated esters of the present novel carboxylic acids, such as the allyl, the methallyl, the crotyl, and homologous or analogous esters containing at least one olefinic bond in the molecule, are useful as polymerizable materials adapted to effective polymerization either alone or with other polymerizable compounds such as compounds containing reactive ethylenic bonds. The carboxylic acids of the present invention also find effective utility as basis for the preparation of derived amides, acid halides, and similar compounds.

The metal and other salts of the present carboxylic acids may be prepared advantageously as by suitable reaction of the free acid with a base, or by reaction leading to cation exchange converting the salt of one metal to the salt of another. The alkali metal salts such as sodium, potassium, lithium, etc., the ammonium salt, the alkaline earth metal salts such as cesium, magnesium, calcium, and rubidium, and other metal salts such as the lead, copper, mercury, silver, barium, cadmium, chromium, cobalt, iron, nickel, aluminum, manganese, and similar salts thus are provided. The copper and similar salts of toxic metals are of particular value as components of insecticidal and fungicidal compositions, etc. The cobalt, manganese, and similar salts are of value as driers in paint compositions, and the like.

The following examples will serve to illustrate certain specific embodiments of the present invention.

EXAMPLE I

Preparation of 2,5-dimethyl-3,4-dihydro-1,2-pyran-2-carboxaldehyde

Methacrolein containing 1 per cent by weight of added hydroquinone was dissolved in an equal weight of benzene and the solution was heated at 170° C. for 3 hours under autogenous pressure in a glass-lined reaction vessel. Upon fractional distillation of the resultant mixture, there was recovered the compound having the apparent structure of 2,5-dimethyl-3,4-dihydro-1,2-pyran-2-carboxaldehyde, in a conversion of 77 per cent based on the methacrolein consumed and in a yield of 94 per cent. It had a boiling point of 101.0° to 101.4° C. under a pressure of 90 mm. It had a refractive index (N20/D) of 1.4537. A semicarbazone thereof melted at 177° C. after recrystallization in water. The free aldehyde was insoluble in water and in dilute acid. The aldehyde was found to contain 68.43 per cent carbon and 8.66 per cent hydrogen. Theory for $C_8H_{12}O_2$, 68.54 per cent carbon and 8.63 per cent hydrogen. The structural formula for 2,5-dimethyl-3,4-dihydro-1,2-pyran-2-carboxaldehyde is

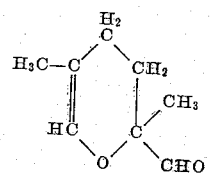

EXAMPLE II

Continuous preparation of 2,5-dimethyl-3,4-dihydro-1,2-pyran-2-carboxaldehyde

A stream of methacrolein containing 1 per cent by weight of hydroquinone was heated to 210° C. under pressure and passed through a stainless steel reaction tube having a free space of 185 cc., and maintained at 210° C., at a flow rate corresponding to 1.28 volumes of feed per hour per volume of tube and under a pressure of about 650 pounds per square inch. Upon fractional distillation of the product, the compound designated as 2,5-dimethyl-3,4-dihydro-1,2-pyran-2-carboxaldehyde was recovered in 95 per cent yield based upon the methacrolein consumed.

and the structural formula for 2-methyl-3,4-dihydro-1,2-pyran-2-carboxylic acid is

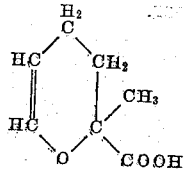

Example VII
Preparation of 2,5-dimethyltetrahydropyran-2-methanol 2,5-dimethyl-3,4-dihydro-1,2-pyran-2- carboxaldehyde prepared as in Example II was hydrogenated in the presence of 10 per cent by weight of Raney nickel catalyst, at a temperature of 100°–125° C. for 22 hours and at a hydrogen pressure of 800–1200 pounds per square inch. After removal of the catalyst, the corresponding 2,5-dimethyltetrahydropyran-2-methanol was recovered by distillation in 82% yield. The product distilled at 82.8°–83.6° C. under 10 millimeters mercury pressure and had a refractive index (n 20/D) of 1.4559. The structural formula for 2,5-dimethyltetrahydropyran-2-methanol is

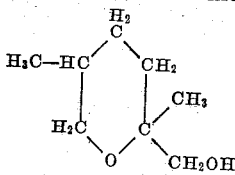

Example VIII
Hydrogenation of 2,5-dimethyl-3,4-dihydro-1,2-pyran-2-carboxaldehyde One mole of 2,5-dimethyl-3,4-dihydro-1,2-pyran-2-carboxaldehyde when treated with hydrogen under a pressure of 1000 pounds per square inch at 25° C. to 55° C. for 36 hours in the presence of 10% by weight of Raney nickel catalyst, absorbed 1.75 moles of hydrogen. The products of the hydrogenation were separated by distillation and 2,5-dimethyl-3,4-dihydro-1,2-pyran-2-methanol and 2,5-dimethyltetrahydropyran-2-methanol were obtained.

I claim as my invention:

1. A dimethyldihydropyran carboxaldehyde having a structure corresponding to the formula

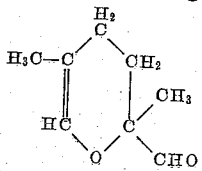

2. A monomethyldihydropyran carboxaldehyde having a structure corresponding to the formula

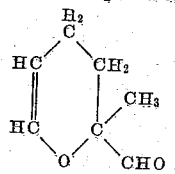

3. A dichlorodihydropyran carboxaldehyde having a structure corresponding to the formula:

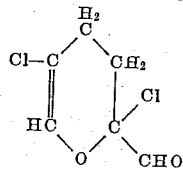

4. As new chemical compounds, the members of the class of compounds consisting of (1) dihydropyran derivatives having structures corresponding to the formula

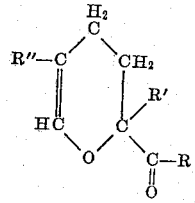

wherein R represents one of the class consisting of hydrogen, hydroxyl, metaloxy, and hydrocarbyloxy, R' represents one of the class consisting of halogen and hydrocarbyl, and R" represents one of the class consisting of hydrogen, halogen, and hydrocarbyl and (2) the corresponding tetrahydropyran derivatives.

5. A dihydropyran compound according to claim 4 wherein R represents the hydrogen atom.

6. A dihydropyran compound according to claim 4 wherein R represents the hydrogen atom and R' and R" represent different organic substituent groups.

7. A compound according to claim 4 wherein R' and R" represent different organic substituent groups.

8. A process of preparing a dimethyl-dihydropyran carboxaldehyde having a methyl group and the formyl group attached to one carbon atom of the dihydropyran ring, comprising heating at a temperature from about 100° C. to about 240° C. a mixture comprising as its only active ingredients methacrolein and from about 0.025 to about 2 per cent by weight of hydroquinone under a pressure sufficient to maintain the liquid state.

9. A process of preparing a dialkyl-dihydropyran carboxaldehyde having an alkyl group and the formyl group attached to one carbon atom of the dihydropyran ring, comprising heating at a temperature from about 100° C. to about 240° C. a mixture comprising as its only active ingredients an alpha-alkyl acrolein and from about 0.01 to about 5 per cent by weight of a polymerization inhibitor under a pressure sufficient to maintain the liquid state.

10. A process of preparing a monomethyldihydropyran carboxaldehyde having the methyl group and the formyl group attached to the same carbon atom of the dihydropyran ring, comprising heating at a temperature between about 100° C. and about 240° C. a mixture comprising as its only active ingredients methacrolein and acrolein and from about 0.01 to about 5 per cent by weight of a polymerization inhibitor under a pressure sufficient to maintain the liquid state.

11. A process of preparing a monoalkyldihydropyran carboxaldehyde having the alkyl group and the formyl group attached to the same carbon atom of the dihydropyran ring, comprising heating at a temperature between about 100° C. and about 240° C. a mixture comprising as its only active ingredients on alpha-alkylacrolein and acrolein and from about 0.01 to about 5 per cent by weight of a polymerization inhibitor under a pressure sufficient to maintain the liquid state.

12. A process of preparing a dichlorodihydropyran carboxaldehyde having a halogen atom and the formyl group attached to one carbon atom of the dihydropyran ring, comprising heating at a temperature of from about 45° C. to about 100° C. a mixture comprising as its only active ingredients alpha-chloroacrolein and from about 0.01 to about 5 per cent by weight of a polymeri-

EXAMPLE III

*Preparation of 2-methyl-3,4-dihydro-1,2-pyran-2-carboxaldehyde*

A mixture of 1700 parts of methacrolein and acrolein present in a 1:2.6 molar ratio, containing 1 per cent of hydroquinone, was passed in a continuous stream through the reactor used in Example II, at 210° C. and under a pressure of 620–720 pounds per square inch and at a rate equal to 1.85 volumes of the mixture per hour per volume of reactor. A fraction boiling between 78° C. under 90 millimeters pressure and 58.4° C. under 16 millimeters pressure and amounting to 502 parts was separated by fractional distillation. Redistillation of this fraction resulted in the separation of 330 parts of the compound having the apparent structure of 2-methyl-3,4-dihydro-1,2-pyran-2-carboxaldehyde boiling at 84.4–85.5° C. under a pressure of 90 millimeters of mercury, and having a refractive index of 1.455–1.456. Its semicarbazone had a melting point of 144.5° C. The melting point of a mixture of its semicarbazone with the semicarbazone prepared in Example I was substantially below 144.5° C. The free aldehyde was slightly soluble in water and soluble in dilute acid. Its semicarbazone was found to contain 22.3 per cent nitrogen and 51.9 per cent carbon. Theory for $C_8H_{13}O_2N_3$, 22.9 per cent nitrogen and 52.4 per cent carbon. The structural formula for 2-methyl-3,4-dihydro-1,2-pyran-2-carboxaldehyde is

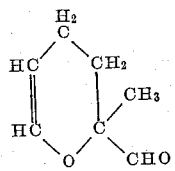

EXAMPLE IV

*Preparation of 2,5-dichloro-3,4-dihydro-1,2-pyran-2-carboxaldehyde*

Alpha-chloroacrolein containing 1 per cent of hydroquinone was heated under autogenous pressure to 75° C. for 2 hours. 2,5-dichloro-3,4-dihydro-1,2-pyran-2-carboxaldehyde distilling at 73°–75° C. under 6–7 millimeters mercury pressure, was recovered in good yield. The product was found to contain 38.5 per cent chlorine. Calculated for $C_5H_6Cl_2O_2$, 39.2 per cent. The structural formula for 2,5-dichloro-3,4-dihydro-1,2-pyran-2-carboxaldehyde is

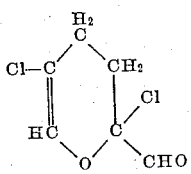

EXAMPLE V

*Preparation of 2,5-dimethyl-3,4-dihydro-1,2-pyran-2-carboxylic acid*

One hundred seventy-nine parts of sodium hydroxide in the form of a 40% aqueous solution was added in one-half hour to 300 parts of the 2,5-dimethyl-3,4-dihydro-1,2-pyran-2-carboxaldehyde prepared in Example II while the mixture was held by cooling at 40°–50° C. The nearly solid resultant mixture was diluted with 300 parts of water and extracted four times with a total of 1000 parts of ether.

The ether solution was dried and distilled. 130 parts of the corresponding 2,5-dimethyl-3,4-dihydro-1,2-pyran-2-methanol, distilling at 75.8°–79.6° C. under a pressure of 7–8 millimeters of mercury, and having a refractive index ($n$ 20/D) of 1.4733, were recovered. The alcohol was found to contain 67.53 per cent carbon and 9.90 per cent hydrogen. Calculated for $C_8H_{14}O_2$, 68.02 per cent carbon and 9.92 per cent hydrogen.

The aqueous solution remaining after the extraction with ether and which contained the sodium salt of the corresponding 2,5-dimethyl-3,4-dihydro-1,2-pyran-2-carboxylic acid was acidified at 0° C. with sulfuric acid and extracted with additional ether. Evaporation of the dried ether solution left a residue which was crystallized from petroleum ether as white crystals of 2,5-dimethyl-3,4-dihydro-1,2-pyran-2-carboxylic acid having a melting point of 61°–62.5° C. The free acid had an acid number of 0.641 equivalents per 100 grams compared to its calculated value of 0.642. The structural formula for 2,5-dimethyl-3,4-dihydro-1,2-pyran-2-carboxylic acid is

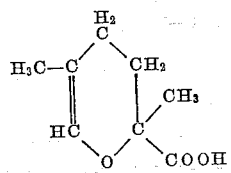

and the structural formula for 2,5-dimethyl-3,4-dihydro-1,2-pyran-2-methanol is

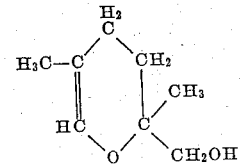

EXAMPLE VI

*Preparation of 2-methyl-3,4-dihydro-1,2-pyran-2-carboxylic acid*

2-methyl-3,4-dihydro-1,2-pyran-2-carboxaldehyde prepared as in Example III was treated with sodium hydroxide according to the method of Example V, and the product was separated into fractions also in a similar manner. The compound designated as 2-methyl-3,4-dihydro-1,2-pyran-2-methanol having a boiling point of 75° C. under 10 millimeters mercury pressure and a refractive index ($n$ 20/D) of 1.4752, and the corresponding 2-methyl-3,4-dihydro-1,2-pyran-2-carboxylic acid were recovered in excellent yield. The acid was a viscous oil which did not form crystals from petroleum ether. Analyses verified the empirical formulas $C_7H_{12}O_2$ and $C_7H_{10}O_3$ for the alcohol and acid, respectively. The structural formula for 2-methyl-3,4-dihydro-1,2-pyran-2-methanol is

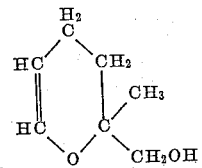

zation inhibitor under a pressure sufficient to maintain the liquid state.

13. A process of preparing a compound in the 2,5-dimethyl-3,4-dihydro-1,2-pyran series of compounds which comprises heating at a temperature between about 100° C. and about 240° C. a mixture comprising as its only active ingredients methacrolein and a polymerization inhibitor under pressure sufficient to maintain the liquid state.

14. A process of preparing a substituted dihydropyran carboxaldehyde comprising heating in the liquid state under superatmospheric pressure at a reaction temperature between about 50° C. and about 240° C. for a time between ¼ and 24 hours a mixture comprising as its only active ingredients a member of the group consisting of (a) an alpha-methylene aldehyde having the formula $CH_2=C(R°)-CHO$ wherein R° represents a member of the group consisting of halogen and hydrocarbyl, (b) mixtures of said aldehydes, and (c) mixtures of said aldehydes with acrolein, and a polymerization inhibitor, and recovering the substituted dihydropyran carboxaldehyde from the mixture thus produced.

15. A process of preparing a substituted dihydropyran carboxaldehyde comprising heating in the liquid state under superatmospheric pressure at a reaction temperature between about 50° C. and about 240° C. for a time between ¼ and 3 hours a mixture comprising as its only active ingredients a member of the group consisting of (a) an alpha-methylene aldehyde having the formula $CH_2=C(R°)-CHO$ wherein R° represents a member of the group consisting of halogen and hydrocarbyl, (b) mixtures of said aldehydes, and (c) mixtures of said aldehydes with acrolein, and a polymerization inhibitor, and recovering the substituted dihydropyran carboxaldehyde from the mixture thus produced.

RICHARD R. WHETSTONE.

REFERENCES CITED

The following references are of record in the file of this patent:

UNITED STATES PATENTS

| Number | Name | Date |
| --- | --- | --- |
| 2,105,284 | Groll | Jan. 11, 1938 |
| 2,150,137 | Swallen | Mar. 7, 1939 |

OTHER REFERENCES

Moreau et al., Chemical Abstracts, vol. 17, 1923, page 2105.

Moreau et al., Chemical Abstracts, vol. 19, 1925, pages 1125–1127.

Certificate of Correction

Patent No. 2,479,283

August 16, 1949

RICHARD R. WHETSTONE

It is hereby certified that errors appear in the printed specification of the above numbered patent requiring correction as follows:

Column 8, line 50, strike out the comma after "tetrahydropyran"; column 9, line 42, for the word "generally" read *gradually*; column 16, line 64, for "ingredients on" read *ingredients an*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*